(12) United States Patent
Anwar

(10) Patent No.: US 6,728,620 B2
(45) Date of Patent: Apr. 27, 2004

(54) PREDICTIVE CONTROL ALGORITHM FOR AN ANTI-LOCK BRAKING SYSTEM FOR AN AUTOMOTIVE VEHICLE

(75) Inventor: Sohel Anwar, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 53 days.

(21) Appl. No.: 10/071,070

(22) Filed: Feb. 8, 2002

(65) Prior Publication Data

US 2003/0154012 A1 Aug. 14, 2003

(51) Int. Cl.[7] ............................................. B60T 13/74
(52) U.S. Cl. ..................... 701/70; 701/71; 701/74; 701/78; 303/166; 303/167; 188/181 T
(58) Field of Search ............................. 701/71, 70, 74, 701/78; 303/166, 167; 188/181 A, 181 T; 180/197

(56) References Cited

U.S. PATENT DOCUMENTS

| | | |
|---|---|---|
| 4,358,822 A | 11/1982 | Sanchez |
| 4,794,538 A | 12/1988 | Cao et al. |
| 5,424,942 A | 6/1995 | Dong et al. |
| 5,513,907 A | 5/1996 | Kiencke et al. |
| 5,539,641 A * | 7/1996 | Littlejohn ................ 701/70 |
| 5,697,682 A | 12/1997 | Watanabe et al. |
| 6,064,931 A | 5/2000 | Sawada et al. |
| 6,122,585 A | 9/2000 | Ono et al. |
| 6,125,318 A | 9/2000 | Zierolf |
| 6,283,559 B1 | 9/2001 | Yamada et al. |

* cited by examiner

Primary Examiner—Thomas G. Black
Assistant Examiner—Arthur Donnolly
(74) Attorney, Agent, or Firm—John Kajander

(57) ABSTRACT

A control system (12) for an automotive vehicle includes a wheel speed sensor (18) generating a rotational speed signal and a controller (14) coupled to the wheel speed sensor. The controller determines a vehicle speed, calculates wheel slip based upon the vehicle speed and the rotational speed, calculates a predicted future wheel slip based upon the vehicle speed and the rotational speed, estimates a normal force on the wheel, calculates a modified brake torque signal in response to the wheel slip, the predicted future wheel slip and the normal force, and actuates the wheel brake in response to the modified brake torque signal.

20 Claims, 3 Drawing Sheets

PREDICTIVE CONTROL ALGORITHM FOR AN ANTI-LOCK BRAKING SYSTEM FOR AN AUTOMOTIVE VEHICLE

TECHNICAL FIELD

The present invention relates generally to an anti-lock braking system for an automotive vehicle, and more specifically, to a method and apparatus for controlling the braking torque of the wheel in accordance with a predicted value of slip.

BACKGROUND

Anti-lock braking systems are commonly used in automotive vehicles to prevent the wheels from locking when the vehicle is over-braked. By preventing the wheels from locking the directional stability and steerability of the vehicle may be maintained. Each of the wheels is typically monitored separately and controlled separately. Each wheel has a wheel-speed sensor that monitors the rotational motion of the wheel. If one of the wheels shows signs of locking there is a sharp rise in the peripheral wheel deceleration and in wheel slip. If the wheel slip exceeds a defined value, a brake controller commands a solenoid valve unit to stop or reduce the build up of brake pressure. The brake pressure is subsequently increased to prevent an under-brake situation.

Typically, such systems merely monitor the slip rate or the wheel speed in determining whether to apply brake pressure or reduce brake pressure. The amount of reduction or increase in the application of brake pressure is typically a constant or an open loop value. The amount of pressure or torque is not typically taken into consideration. That is, a fixed amount of brake pressure is applied or removed. Likewise, only measured conditions are taken into account. That is the applied brake pressure is applied to the braking system according to past sensed conditions.

It would therefore be desirable to adjust an amount of braking torque or pressure to the vehicle wheels in response to sensed operating conditions and predicted future conditions of the vehicle rather than merely a fixed amount based upon wheel slip.

SUMMARY OF THE INVENTION

The present invention uses sensed and predicted vehicle conditions such as wheel slip to determine a braking torque for each wheel of the vehicle.

In one aspect of the invention, a control system for an automotive vehicle includes a wheel speed sensor generating a rotational speed signal and a controller coupled to the wheel speed sensor. The controller estimates a vehicle speed, calculates wheel slip based upon the vehicle speed and the rotational speed, calculates a predicted future wheel slip based upon the vehicle speed and the rotational speed, estimates a normal force on the wheel, calculates a modified brake torque signal in response to the wheel slip, the predicted future wheel slip and the normal force, and actuates the wheel brake in response to the modified brake torque signal.

In a further aspect of the invention, a method of controlling a vehicle having a wheel and wheel brake comprises measuring rotational speed of a wheel, determining a vehicle speed, calculating wheel slip based upon the vehicle speed and the rotational speed, calculating a future predicted wheel slip based upon the vehicle speed and the rotational speed, estimating a normal force on the wheel, calculating a modified brake torque signal in response to the wheel slip, the predicted future wheel slip and the normal force, and actuating the wheel brake in response to the modified brake torque signal.

One advantage of the invention is that an amount of braking torque to be applied for each vehicle is calculated using the varying conditions of the vehicle and predicted future conditions and thus a more accurate representation of the amount of brake torque to be applied may be determined. Consequently, the response of the anti-lock brake system is more rapid than previously known brake systems.

Other advantages and features of the present invention will become apparent when viewed in light of the detailed description of the preferred embodiment when taken in conjunction with the attached drawings and appended claims.

DESCRIPTION OF THE PREFERRED EMBODIMENT

Figure 1:
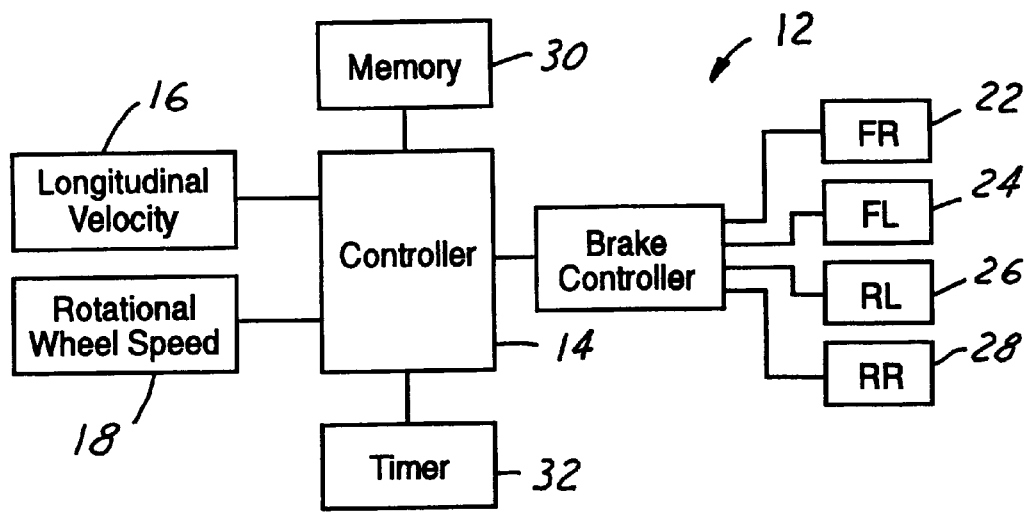
FIG. 1 is a block diagram showing a portion of a microprocessor interconnected to sensors and controlled devices which may be included in a system according to the present invention.

In the following figures the same reference numerals will be used to identify the same components in the various views.

Referring now to FIG. 1, an automotive vehicle 10 having an anti-lock brake control system 12 is illustrated having a controller 14 used for receiving information from a number of sensors that may include a longitudinal velocity estimator 16 and a rotational wheel speed sensor 18. Other sensors such as lateral acceleration, pitch rate, yaw rate or roll rate may also be used but has little effect on the torque calculation as described below. Based on inputs from sensor 16, 18, controller 14 controls a brake controller 20 to provide an amount of brake torque by regulating a plurality of brake actuators including electromagnetic, electromechanical, and electrohydraulic actuators or a combination thereof, at a front right brake and wheel assembly 22, a front left brake and wheel assembly 24, a rear left brake and wheel assembly 26, and a right rear brake and wheel assembly 28. Although controller 14 and controller 20 are illustrated as separate components, one single microprocessor may implement the functions of both.

Controller 14 is coupled to a memory 30 and a timer 32. Memory 30 may be used to store various information used in the following calculations such as the vehicle speed and the effective wheel rolling rate. The timer may be used for timing various events such as up timing and down timing as well as the synchronization of the control system described herein.

Longitudinal velocity sensor and rotational wheel speed sensor 18 may be integrally formed. Each wheel has a rotational wheel speed sensor 18 that may be averaged by controller 14 to obtain the longitudinal velocity 16 of the vehicle. Of course, the longitudinal speed of the vehicle may be determined by various other types of sensors such as a transmission sensor. Also, in the averaging scenario, when the vehicle is speeding up or braking around a corner, the lowest or highest wheel speed may not be used because of its error. Various schemes for measuring wheel speed and the speed of the vehicle would be evident to those skilled in the art.

Figure 2:
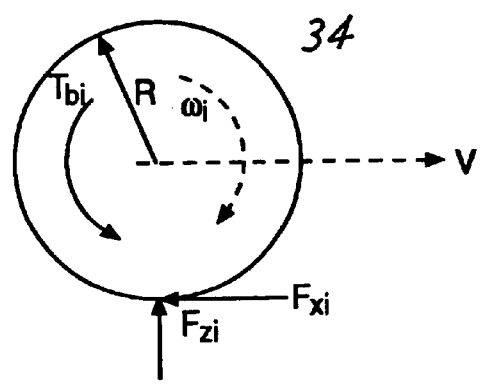
FIG. 2 is a side view of a wheel illustrating the dynamic forces during a braking event.

Referring now to FIG. 2, a wheel 34 that generally represents each of the wheels of the vehicle, is illustrated having various forces acting thereon. $T_{bi}$ is the brake torque at the i-th wheel. $\omega_i$ is the angular speed of i-th wheel, $F_{xi}$ is the longitudinal frictional force at the i-th higher contact patch, $F_{zi}$ is the normal force of the i-th wheel, and V is the velocity of the vehicle.

Like most of the ABS control algorithm, the current controller also requires the knowledge of wheel slip. The objective of the controller is to keep the wheel slip at a value that would maximize the tire-road adhesion (or minimize the tire slip). This is unlike previously known systems that oscillate greatly and have greater variations in slip angles. A predictive wheel slip error cost function is given by the formula:

$$J_i = \sum_{j=1}^{N} [\kappa_{ides}(t+j) - \kappa_i(t+j)]^2 \quad (1)$$

where $J_i$=Slip performance index for i-th tire

N=Prediction horizon $\kappa_{ides}$(t j)=Desired slip for i-th tire at time t+j=Percent Desired Slip for i-th tire * Vehicle Speed $\kappa_i$(t j)=Estimated slip for i-th tire at time t+j Now tire slip is obtained from the following definition:

$$\kappa_i(t) = U_r - R\omega_i \quad (2)$$

where

R=Effective rolling radius for the tire $\omega_i$=Wheel rotational speed for i-th tire $U_r$=Vehicle longitudinal speed in road co-ordinate system.

In order to project the future output for the vehicle and wheel speed, it is necessary to obtain the dynamic equations for the vehicle motion. A simplified vehicle model is obtained first. Thereafter, the model is discretized using a bilinear transformation. The vehicle motion in the longitudinal direction on the road plane is described by the following equation.

$$\Sigma F_{xr} = F_{xsumr} + F_{txr} - F_{axr} = M(\dot{U}_r - V_r r_r) + m_s \dot{Z}_{sr}$$

where $F_{xsumr}$=sum of road forces in the x-direction at the road tire interfaces $F_{txr}$=Terrain forces at the c.g. arising out of road slopes and grades $F_{axr}$=Aerodynamic drag forces on the vehicle M=Total vehicle mass U=Vehicle longitudinal velocity $V_r$=Vehicle lateral velocity $r_r$=Vehicle yaw velocity $m_s$=Sprung mass of the vehicle $^s$=Sprung mass velocity in the $q_r$=Pitch velocity of the sprung mass The wheel rotational dynamics is given by the following equation:

$$\Sigma M_y = T_{bi} - F_{xi}R - F_{rri}R - T_{di} = -I_{wi}\dot{\omega}_i$$

where $T_{bi}$=Brake torque at i-th wheel $\omega_i$=Angular speed of i-th wheel $F_{xi}$=Longitudinal friction force at i-th tire contact patch R=Effective wheel rolling radius $F_{rri}$=Rolling Resistance at i-th tire contact patch $T_{di}$=Drive torque at i-th wheel $I_{wi}$=i-th wheel rotational inertia =Angular acceleration of i-th wheel For a braking event, the following set of equations of motion is written.

$$F_{xsumr} + F_{txr} - F_{axr} = M(\dot{U}_r - V_r r_r) + m_s \dot{Z}_{sr}$$

$$T_{bi} - F_{xi}R - F_{rri}R - T_{di} = -I_{wi}\dot{\omega}_i$$

The pitch dynamics of the vehicle in the first equation is assumed to have negligible effect on the wheel braking forces. For the sake of simplicity, the effect of terrain forces arising out of road slopes and grades are also neglected. The drive torque (in a braking situation) is assumed to be insignificant in the second equation. Further simplification is made by assuming that the steer wheel angle is zero resulting in zero lateral motion. Now the following relationships are defined by the formula:

$$F_{xi} = \mu_i F_{zi}; \ F_{rri} = F_z$$

where $\mu_i(\kappa)$=Friction Coefficient and $\eta$=Rolling Resistance Coefficient;

Since a simple model is desired for the proposed controller development, the effect of aerodynamic drag and rolling resistance on the above equation are neglected. The above assumption is justified based on the fact that the rolling resistance is insignificant compared to the braking force in a braking event. Also, the aerodynamic drag is small for the normal driving speeds. Since this controller is a closed loop system, these effects can be compensated through the feedback information. The following equations are obtained:

$$F_{xsumr} = -\Sigma \mu_i(\kappa_i)F_z;$$

The simplified equations of motion are then given by:

$$-\Sigma \mu_i(\kappa_i)F_{zi} = M$$

$$T_{bi} - \mu_i(\kappa_i)F_{zi}R = -I_{wi}\dot{\omega}_i$$

Based on the above equations, the plant model for designing a controller is obtained as follows (for braking):

$$\dot{U}_r = -\frac{1}{M}\Sigma \mu_i(\kappa_i)F_z$$

$$\dot{\omega}_i = -\frac{1}{I_{wi}}(T_{bi} - \mu_i(\kappa_i)F_{zi})$$

Now, $$\kappa_i = (U_r - R\omega_i)$$

Then, $$\dot{\kappa}_i = \left(\dot{U}_r - R\dot{\omega}_i\right) = \frac{R}{I_{wi}}(T_{bi} - \mu(\kappa)F_{zi}R) - \frac{1}{M}\Sigma\mu_i(\kappa_i)F_{zi} \quad (3)$$

Figure 3:
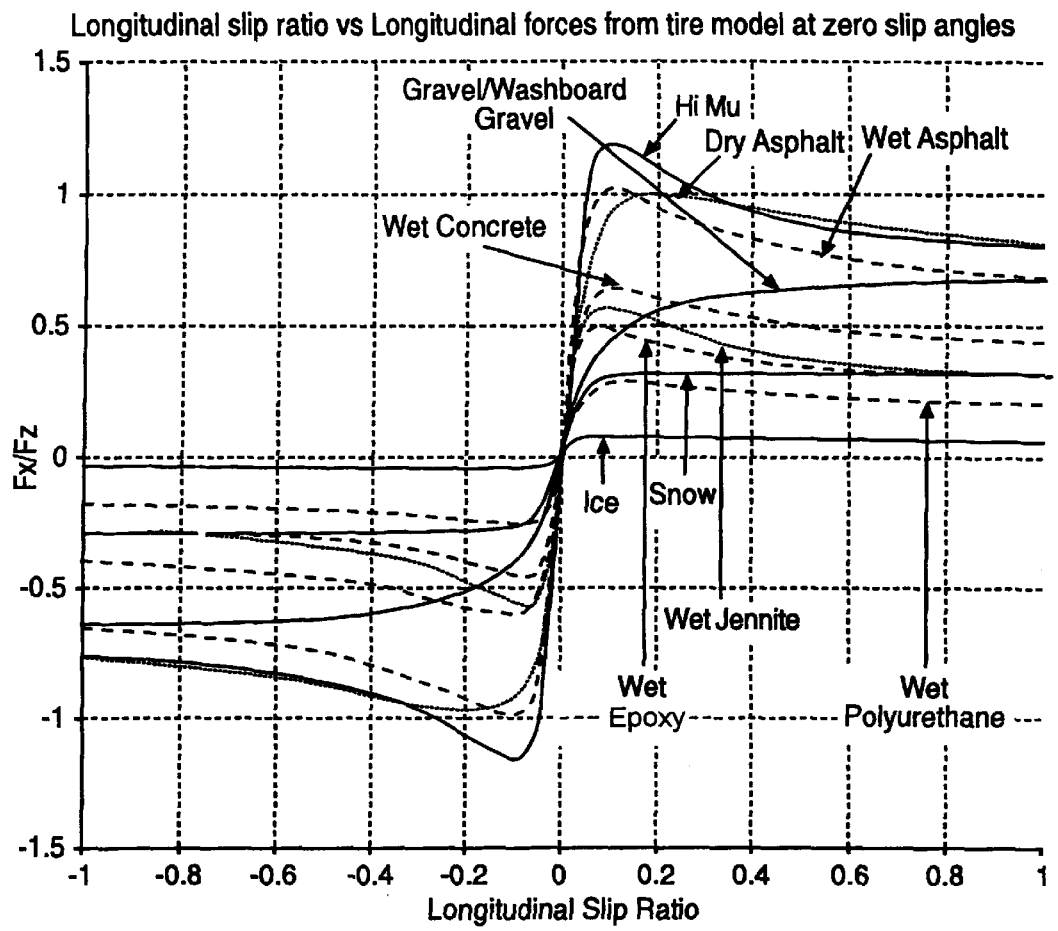
FIG. 3 is a plot of friction coefficients versus a slip curve for a number of road-tire interfaces.
Figure 4:
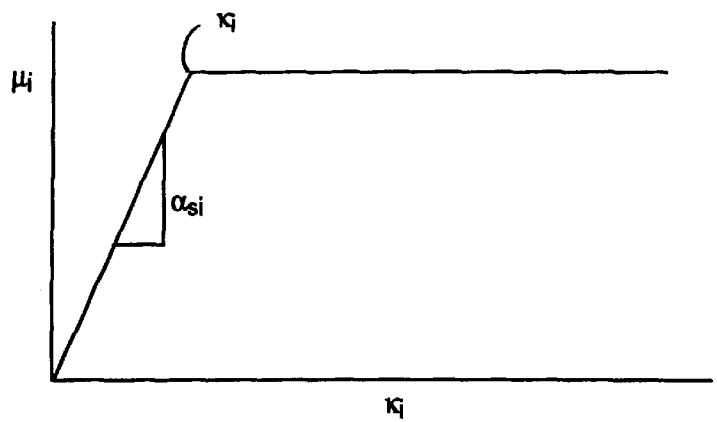
FIG. 4 is a simplified friction coefficient versus slip curve plot.

Referring now to FIG. 3, the friction coefficient curves for a number of road-tire interfaces are illustrated. As is evident, the peak of the friction coefficient curve varies significantly depending on the road condition. The slip value at the peak friction coefficient also varies between 0.1 to 0.2. It is clear that the friction coefficient relationship with slip adds non-linearity to equation (3). Since all of the curves in FIG. 3 exhibit linear relationship with slip below the peak of the curve, the relationship between the coefficient of friction and the slip can be approximated with a piecewise linear function. This concept is illustrated in FIG. 4. The friction curves are approximated by a straight line with a slope of $\alpha_{si}$ and a slip threshold of $k_{th}$. While the peak of these friction curves varies over a slip range, a slip threshold $\kappa_{th}$ and initial slope $\alpha_{si}$ can be established for sub-optimal performance. Sub optimal refers to the inexact value of the threshold $\kappa_{th}$ that varies between 0.1 and 0.2 as noted in FIG. 3 above. As noted below, some value may be chosen for approximation.

A piecewise linear friction coefficient-slip relationship can be described as follows. This relationship is illustrated in FIG. 4.

$$\mu_i(\kappa_i) = \alpha_{si} * \kappa_i \text{ if } \kappa_i \leq \kappa_t \quad (4)$$
$$= \alpha_{si} * \kappa_{th} \text{ if } \kappa_i \geq \kappa_{th}$$

Therefore, equation (3) can be rewritten as, $$\dot{\kappa}_i = \frac{R}{I_{wi}}(T_{bi} - \alpha_{si}\kappa_i F_{zi}R) - \frac{1}{M}\Sigma\alpha_{si}\kappa_i F_z \quad (5)$$

The last term in the above equation represents the total friction force on the vehicle. The variation in this term due to variation in the friction coefficient from one wheel to the other is not going to affect the overall equation significantly. Therefore, it is assumed that the friction coefficients in the last term in equation (5) have the same value as that of the particular wheel. With this assumption, equation five can be further simplified as follows:

$$\dot{\kappa}_i = \frac{R}{I_{wi}}(T_{bi} - \alpha_{si}\kappa_i F_{zi}R) - \alpha_{si}\kappa_i g \quad (6)$$

The above is the linearized equation for the braking dynamics. A Laplace transform of the above yields:

$$\frac{\kappa_i(s)}{T_{bi}(s)} = \frac{R/I_{wi}}{s + \left(\alpha_{si}g + \frac{R^2 F_{zi}\alpha_{si}}{I_{wi}}\right)} \quad (7)$$

$$\frac{\kappa_i(s)}{T_{bi}(s)} = \frac{B}{s+A}$$

where $$B = \frac{R}{I_{wi}}; A = \left(\alpha_{si}g + \frac{R^2 F_{zi}\alpha_{si}}{I_{wi}}\right)$$

In the following section, a discrete version of the GPC (Generalized Predictive Control) is derived. A bilinear transformation of the above equation yields $$\frac{\kappa_i(z)}{T_{bi}(z)} = \frac{e(1+z^-)}{c+d^-} \quad (8)$$

where,
 e=BT
 c=(AT+2)
 d=(AT−2)
The above can be rewritten as $$(c+dz^{-1})\kappa_i(z) = e(1+z^{-1})T_{bi}($$

Now the Diophantine prediction equation (j-step ahead predictor) is given by, $$E_j(z^{-1})(c+dz^{-1})\Delta + z^{-j}F_j(z^{-1}) =$$

where,
 $E_j(z^{-1})$=A polynomial in $z^{-1}$ with order (j−1)
 $F_j(z^{-1})$=A polynomial in $z^{-1}$ of degree 1.
Multiplying both sides of equation (9) and rearranging, $$\kappa_i(t+j) = F_j\kappa_i(t) + E_j e(1+z^{-1})\Delta T_{bi}(t+j-1$$

The objective function can now be rewritten in matrix format as, $$J = [K_{iDes} - K_i]^T[K_{iDes} - K_i]$$

where, $$K_{iDes} = [\kappa_{iDes}(t+1)\kappa_{iDes}(t+2) \ldots \kappa_{iDes}(t+N)]$$

$$K_i = [K_i(t+1)K_i(t+2) \ldots K_i(t+N)] \quad (9)$$

where $$K_i(t+1) = F_1\kappa_i(t) + G_1\Delta T_{bi}(t)$$
$$K_i(t+2) = F_2\kappa_i(t) + G_2\Delta T_{bi}(t+1)$$
$$\vdots$$
$$K_i(t+N) = F_N\kappa_i(t) + G_N\Delta T_{bi}(t+N-1)$$

where $$G_j(z^{-1}) = E_j(z^{-1})e(1+z^{-1})$$

The predicted slip equations can be re-written in a matrix format as follows:

$$K_i = G * U + f$$

where $$G = \begin{bmatrix} g_0 & 0 & \ldots & 0 \\ g_1 & g_0 & \ldots & 0 \\ \ldots & \ldots & \ldots & \ldots \\ g_{N-1} & g_{N-2} & \ldots & g_0 \end{bmatrix}$$

$$U = [\Delta T_{bi}(t)\Delta T_{bi}(t+1) \ldots \Delta T_{bi}(t+N-1)]^T$$

$$f = [f(t+1)f(t+2) \ldots f(t+N)]^T$$

$$f(t+1) = [G_1(z^{-1}) - g_{10}]\Delta T_{bi}(t) + F_1\kappa_i(t)$$

$$f(t+2) = z[G_2(z^{-1}) - z^{-1}g_{21} - g_{20}]\Delta T_{bi}(t) + F_2\kappa\kappa_i($$

$$\vdots$$

$$G_i(z^{-1}) = g_{i0} + g_{i1}z^{-1} + \ldots$$

The objective function can now be rewritten as follows:

$$J = [K_{iDes} - f - GU]^T [K_{iDes} - f - G]$$

The variables and are the predictive slip variables. Minimization of the Objective function yields the following predictive control law:

$$U = [G^T G]^{-1} G^T (K_{ides} - f)$$

In the above equation, U is a vector. To obtain the control law at present time, only the first element of U is used. Therefore the control law is given by, $$\Delta T_{bi}(t) = \Delta T_{bi}(t-1) + g^T (K_{ides} - f) \quad (10)$$

where $g^T$ is the first row of $[G^T G]^{-1} G^T$.

Equation (10) is the predictive control law for the anti-lock braking system.

As can be seen the brake torque (and the corresponding pressure) is dependent upon the normal force of the tire $F_{zi}$ the tire slip and the value chose for the peak slip angle.

Figure 5:
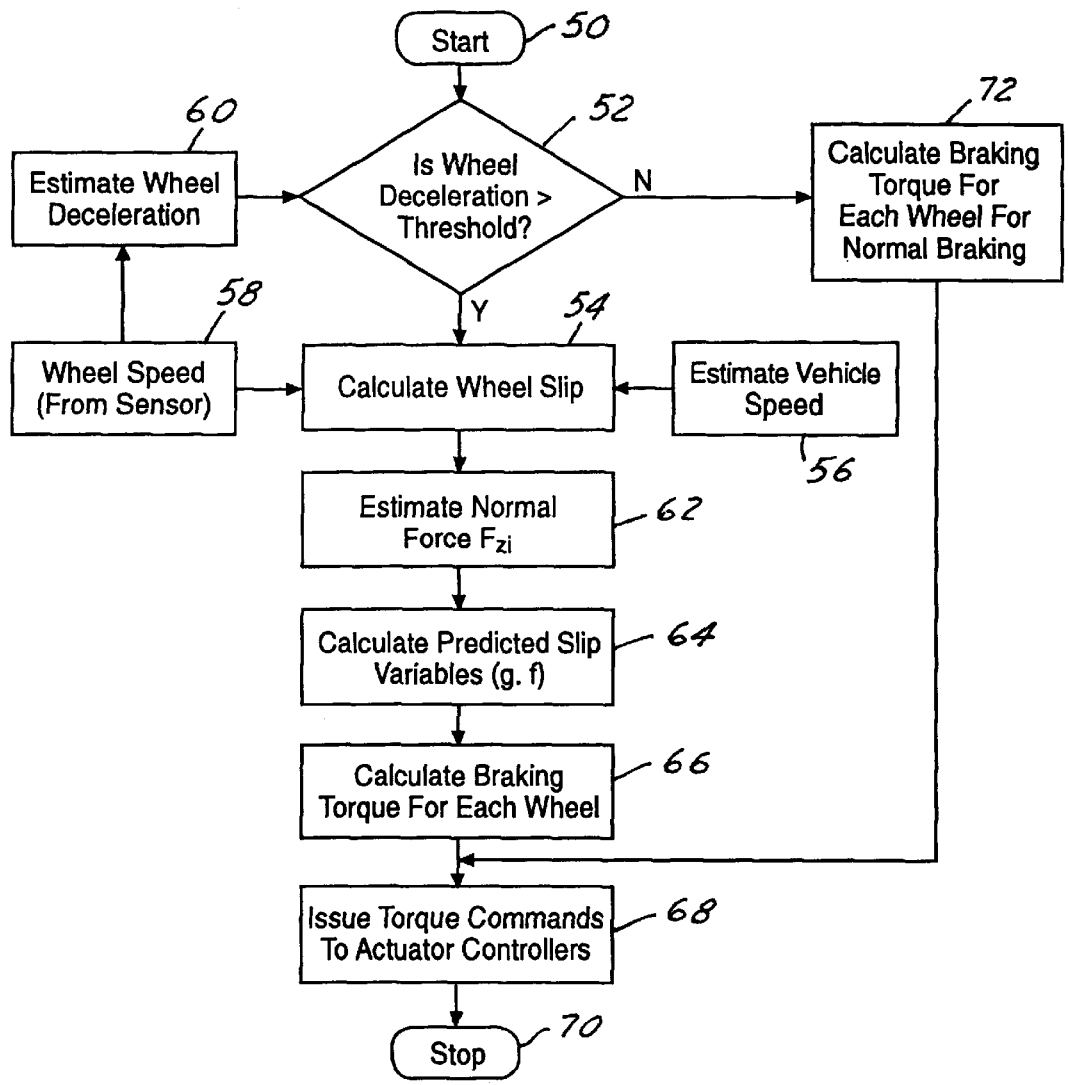
FIG. 5 is a logic flow diagram in accordance with the present invention.

Referring now to FIG. 5, the proposed controller implementation is illustrated in the flow chart starting in step 50. Since equation (10) will provide ABS functionally based on a predefined slip threshold value, the braking performance may be compromised for a normal high friction coefficient road surface. Hence, in the controller implementation, an ABS mode detection is implemented based on the impending wheel lock-up. In step 52 the deceleration of the vehicle is compared to a predetermined threshold value. If the wheel deceleration is greater than a certain threshold value in step 52, the controller raises a flag and the ABS loop is then activated.

After step 52, step 54 determines wheel slip as set forth above. Step 54 relies upon step 56 which estimates the vehicle speed. The wheel slip is calculated according to Equation 2 described above. The wheel slip calculation in block 54 also uses the rotational wheel speed from the wheel speed sensor in block 58. From the wheel speed sensor the wheel deceleration may be estimated in step 60, which in turn is used in step 52 described above.

After the wheel slip is determined in step 54, step 62 is executed in which the normal force $F_{zi}$ is estimated according to the formulas described above. The predicted future wheel slip variables (g,f) are then calculated in step 64 according to the equations set forth above. Once the normal force estimate $F_{zi}$, the wheel slip and the predicted future wheel slip variables are determined, a modified braking torque for each wheel is determined in step 66 according to Equation 10 above. The modified brake torque is different than the brake torque corresponding to brake pedal travel. Based on the calculated brake torque, the braking actuators are commanded to control the brakes accordingly in step 68. The system ends in step 70.

Referring back to step 52, when the deceleration is not above the threshold step 72 is executed in which the brake torque applied for each wheel is the normal braking force associated with the amount of pressure placed upon the brake pedal and not a modified brake torque described in FIG. 10. After step 72, steps 68 and 70 are executed as described above. When step 72 is executed an unmodified brake torque is applied in step 68. That is the amount of brake torque directly corresponds to the input (travel) of the brake pedal.

While particular embodiments of the invention have been shown and described, numerous variations and alternate embodiments will occur to those skilled in the art. Accordingly, it is intended that the invention be limited only in terms of the appended claims.

What is claimed is:

1. A control system for an automotive vehicle having a wheel and wheel brake comprising: a wheel speed sensor generating a rotational speed signal; and a controller coupled to the wheel speed sensor, said controller determining a vehicle speed, calculating wheel slip based upon the vehicle speed and the rotational speed and a predicted wheel slip, estimating a normal force on the wheel, calculating a modified brake torque signal in response to the wheel slip, the predicted wheel slip and the normal force, and actuating the wheel brake in response to the modified brake torque signal.

2. A system as recited in claim 1 further comprising a vehicle speed sensor, said controller determining vehicle speed from the vehicle speed sensor.

3. A system as recited in claim 2 wherein the vehicle speed sensor comprises plurality of wheel speed sensors.

4. A system as recited in claim 1 wherein said controller estimates a slip and a slip angle threshold and calculates the brake torque signal in response to the wheel slip, the normal force, the predicted wheel slip and the slip angle threshold.

5. A system as recited in claim 1 wherein said controller measures a wheel deceleration from the wheel speed sensor; when the wheel deceleration is above a threshold applying the modified torque.

6. A system as recited in claim 5 wherein said controller applies an unmodified torque when the wheel deceleration is below a threshold.

7. A system as recited in claim 1 wherein said controller determines the predicted wheel slip according to a Diophantine equation.

8. A method of controlling a vehicle having a wheel and wheel brake comprising:

measuring rotational speed of a wheel;

determining a vehicle speed;

calculating wheel slip based upon the vehicle speed and the rotational speed;

calculating a predicted future wheel slip based upon the vehicle speed and the rotational speed;

estimating a normal force on the wheel;

calculating a modified brake torque signal in response to the wheel slip, the predicted future wheel slip and the normal force; and actuating the wheel brake in response to the modified brake torque signal.

9. A method as recited in claim 8 further comprising estimating a slip angle threshold and wherein calculating the brake torque signal in response to the wheel slip, the predicted future wheel slip, the normal force and the slip angle threshold.

10. A method as recited in claim 8 further comprising measuring a wheel deceleration; when the wheel deceleration is above a threshold applying a modified brake torque.

11. A method as recited in claim 10 further comprising when a wheel deceleration is below a threshold applying an unmodified brake torque.

12. A method as recited in claim 8 wherein calculating wheel slip comprises calculating a unnormalized wheel slip value.

13. A method as recited in claim 8 wherein determining a vehicle speed comprises determining a vehicle speed in response to the wheel speed.

14. A method as recited in claim 8 wherein calculating a predicted future wheel slip based upon the vehicle speed and the rotational speed comprises calculating the predicted future wheel slip according to a Diophantine equation.

15. A method of controlling braking of an automotive vehicle having a plurality of wheels and brakes comprising:

measuring rotational speed of the plurality of wheels;

determining a vehicle speed;

calculating respective wheel slip for the plurality of wheels based upon the vehicle speed and a respective rotational speed;

calculating respective predicted future wheel slip for the plurality of wheels based upon the vehicle speed and a respective rotational speed;

estimating a normal force on the plurality of wheels;

calculating a respective modified brake torque signal in response to the respective wheel slip, the respective future wheel slip and the normal force for each of the plurality of wheels; and actuating a respective brake in response to the respective modified brake torque signal.

16. A method as recited in claim 15 further comprising estimating a slip angle threshold and wherein calculating a respective modified brake torque signal comprises calculating a respective modified brake torque signal in response to the respective wheel slip, the respective future wheel slip, the normal force and the slip angle threshold.

17. A method as recited in claim 15 further comprising measuring a wheel deceleration; when the wheel deceleration is above a threshold applying the respective modified torque, and applying an unmodified torque when a wheel deceleration is below a threshold.

18. A method as recited in claim 15 wherein calculating a respective wheel slip comprises calculating a respective normalized wheel slip value.

19. A method as recited in claim 15 wherein determining a vehicle speed comprises determining a vehicle speed in response to the wheel speed.

20. A method as recited in claim 15 wherein calculating a respective predicted future wheel slip based upon the vehicle speed and the rotational speed comprises calculating the respective predicted future wheel slip according to a Diophantine function.

* * * * *